United States Patent [19]
Iwamoto et al.

[11] Patent Number: 6,115,535
[45] Date of Patent: Sep. 5, 2000

[54] AUDIO AND VIDEO DATA RECORDING AND REPRODUCING APPARATUS AND METHOD THEREOF

[75] Inventors: Tetsuya Iwamoto; Mikio Kita, both of Kanagawa, Japan

[73] Assignee: Sony Corporation, Tokyo, Japan

[21] Appl. No.: 08/913,085

[22] PCT Filed: Feb. 6, 1997

[86] PCT No.: PCT/IB97/00237

§ 371 Date: Dec. 29, 1997

§ 102(e) Date: Dec. 29, 1997

[87] PCT Pub. No.: WO97/29488

PCT Pub. Date: Aug. 14, 1997

[30] Foreign Application Priority Data

Feb. 7, 1996 [JP] Japan .................................. 8-021255

[51] Int. Cl.[7] .................. H04N 5/928; H04N 5/7826
[52] U.S. Cl. .............................................. 386/96; 386/46
[58] Field of Search ................... 386/96, 95, 98, 386/102, 104, 46, 52, 54, 63, 81, 1, 4, 39; 360/32, 60; H04N 5/782, 5/7826, 5/928

[56] References Cited

U.S. PATENT DOCUMENTS

| | | | |
|---|---|---|---|
| 4,777,537 | 10/1988 | Ueno et al. | 386/96 |
| 5,231,543 | 7/1993 | Kubota et al. | 360/36.1 |
| 6,028,980 | 2/2000 | Yamagata | 386/96 |

*Primary Examiner*—Robert Chevalier
*Attorney, Agent, or Firm*—Frommer Lawrence & Haug, LLP.; William S. Frommer

[57] ABSTRACT

A non-tracking type audio and video data recording and reproducing apparatus and method adapted for use in performing an editing operation wherein data (overlying data) of a unit or group is inserted over previously recorded data (underlying data). During a recording operation, an error correction code(s) is added to the overlying data, the underlying data located in the area wherein the overlying data is to be recorded may be erased, and the overlying data for the tracks other than the first and last tracks thereof is recorded. During reproduction, the reproduced error correction codes and data of the unit of the tracks other than the first and last tracks thereof are utilized to obtain the overlying data of the first and last tracks which are not recorded. Such arrangement may prevent the erroneous reproduction of the underlying and overlying data at the boundaries of the underlying and overlying data.

38 Claims, 12 Drawing Sheets

HIGH FREQUENCY SIGNAL

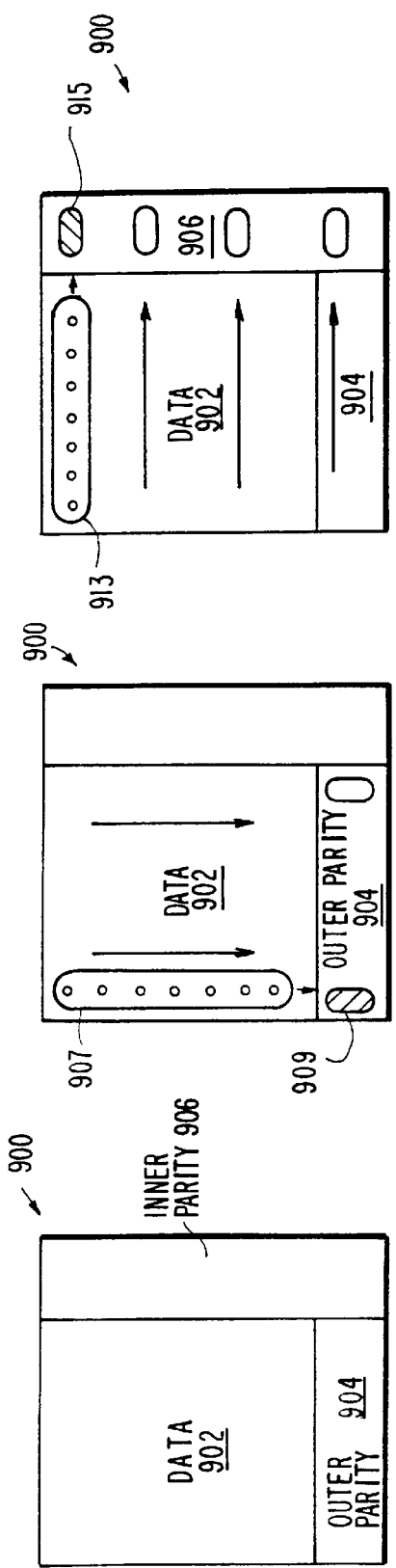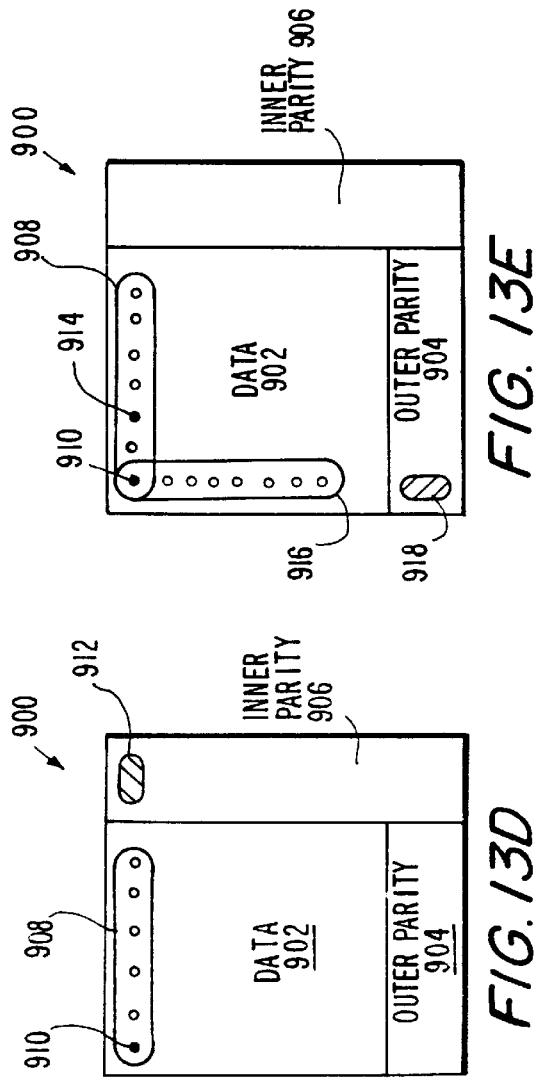

AUDIO AND VIDEO DATA RECORDING AND REPRODUCING APPARATUS AND METHOD THEREOF

BACKGROUND OF THE INVENTION

The present invention relates to a non-tracking audio and video data recording and reproducing technique and, more particularly, to such technique in which audio and video data are recorded over one or more tracks of existing data on a video tape or the like and reproduced therefrom without tracing existing tracks.

Audio and/or video data may be recorded in helical tracks of a video or VTR (video tape recorder) tape by recording heads having respective azimuth angles. Such arrangement enables the azimuth angles associated with the helical tracks to be alternated such that adjoining helical tracks do not have the same azimuth angle. During a reproduction operation, if a helical track having a first azimuth angle is scanned (traced) by a playback head having a second azimuth angle which is different from the first azimuth angle, audio and video data may not be properly reproduced from such helical track. Further, during such reproduction operation, even if a helical track is traced by a playback head having the same azimuth angle as that of the helical track, the reproduced audio and video data may have a relatively large error when the playback head and the helical track deviate from each other.

The above-described principals of azimuth recording and reproducing may apply to a so-called non-tracking type of video or VTR apparatus. Such apparatus may include two playback heads having a positive azimuth angle (positive azimuth heads) and arranged so as to have an interval substantially equivalent to the width of one helical track at the tape travelling surface of a drum, and two playback heads having a negative azimuth angle (negative azimuth heads) and arranged so as to have an interval substantially equivalent to the width of one helical track at, for example, symmetrical positions about the center of rotation of the positive azimuth heads and the drum. In such non-tracking VTR apparatus, the helical tracks may be scanned by the four playback heads so as to read the audio and video data. Such apparatus may further process the read audio and video data to detect errors and correct them using an inner code, assign a high priority to the audio and video data wherein no error was detected and corrected by use of the inner code and assign a lower priority to the audio and video data in which an error occurred and store them in a memory, correct an error or errors in the audio and video data by using an outer code, and output the audio and video data having the least error.

Since, in the above-described non-tracking VTR apparatus, audio and video data obtained by either of the two positive or two negative azimuth heads which are offset from each other by an amount of one track may be output, tracking control of a helical track by the playback heads may be greatly eased such that audio and video data may be recorded without scanning an already existing helical track (underlying track) of the VTR tape.

However, when performing an editing operation by using the above-described non-tracking VTR apparatus which records audio and video data without tracing underlying tracks, there is a possibility that the underlying tracks which are to be overwritten by the first and last tracks of the overlying tracks may remain. Upon such occurrence, if the azimuth angles of the first and last overlying tracks coincide with the azimuth angles of the underlying tracks on which such overlying tracks are to be over-written, both the audio and video data of the overlying tracks and the audio and video data of the underlying tracks may be reproduced during a reproduction operation, thereby resulting in significant error in the reproduced audio and video data.

OBJECTS AND SUMMARY OF THE INVENTION

An object of the present invention is to provide a non-tracking audio and video data recording and reproducing apparatus, and a method thereof, which enable audio and video data to be recorded over existing tracks of a recording medium and to be reproduced therefrom without tracing any already existing helical tracks in a manner so as minimize or eliminate data error which may otherwise occur.

More specifically, it is an object of the present invention to provide a non-tracking audio and video data recording and reproducing apparatus and a method thereof wherein the data of all of the tracks in a unit except for the first and last tracks thereof are recorded and wherein, during reproduction, the data of the first and last tracks are obtained by use of error correction codes and the data from the other tracks within the unit.

Another object of the present invention is to provide a non-tracking audio and video data recording and reproducing apparatus and a method thereof as aforesaid wherein data (underlying data) previously recorded on the recording medium at a location corresponding to that at which the unit of data (overlying data) is to be recorded is erased.

In accordance with an aspect of the present invention, an audio and video data recording and reproducing apparatus and method thereof are provided. The apparatus comprises an error correction code adding device for adding one or more error correction codes to a recording or predetermined unit representing a number of GOPs (groups of pictures) of audio and video data which is recorded over a plurality of helical tracks of a tape recording medium and serves as the unit for error correction processing so as to enable the unit to be reproduced even if more than one helical track of the audio and video data is lost for a respective recording unit; a data recording device for omitting the audio and video data of a first helical track and a last helical track and for azimuth recording the other helical tracks when recording audio and video data of two or more recording units to which are added the error correction codes; a plurality of data reading devices for reading the audio and video data from the helical tracks of the tape recording medium at respectively different azimuth angles so as to obtain a plurality of sets of read audio and video data therefrom, in which the plurality of data reading devices have at least two playback heads which scan the helical tracks at an interval substantially equivalent to a width of one helical track; an error rate detecting device for detecting an error rate of each set of the audio and video data read by the playback heads of the plurality of data reading devices; a selecting device for selecting the set having the lowest detected error rate from among the sets read by the playback heads of the plurality of data reading devices; and a device for producing the audio and video data for the first helical track and the last helical track by using other audio and video data of the recording units and the error correction codes. The audio and video data recording and reproducing method comprises steps which correspond to the audio and video data recording and reproducing apparatus.

In the audio and video data recording and reproducing apparatus according to the present invention, the data recording device of the present apparatus omits or does not record the audio and video data of the first and last overlying tracks in a predetermined unit or group and does azimuth record the audio and video data of the other overlying tracks within such group. By not recording the first and last overlying tracks, a situation is avoided wherein audio and video data recorded on the first and last overlying tracks and audio and video data previously recorded on the underlying tracks (corresponding to such overlying tracks) are reproduced together.

In the present recording and reproducing apparatus according, an error correction code or codes may be added to a recording unit of audio and video data which is recorded over a plurality of helical tracks of a recording medium (such as a VTR tape or the like) and serves as a unit for error correction processing so as to enable reproduction even if one helical track or more of audio and video data is lost or unavailable for every recording unit. By adding an error correction code in this manner, audio and video data of the first and last overlying tracks may be reproduced or obtained by utilizing (i) the other audio and video data contained in the respective unit (recording unit) and recorded on the tracks other than the first and last tracks, and (ii) the error correction code added to the respective recording unit.

The reproduction of the audio and video data is performed by the plurality of data reading devices, the error rate detecting device, and the selecting device of the present non-tracking apparatus. The error correcting device of the present non-tracking apparatus produces or restores the audio and video data which was not recorded in the first and last overlying tracks by using the other audio and video data of the respective recording unit and the error correction code(s).

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWING

FIGS. 13A—13E are diagrams to which reference will be made in explaining the use of error correction codes in reconstructing data which was not recorded.

DETAILED DESCRIPTION OF THE PREFERRED EMBODIMENTS

A first embodiment of the present invention will now be described hereinbelow.

Figure 1:
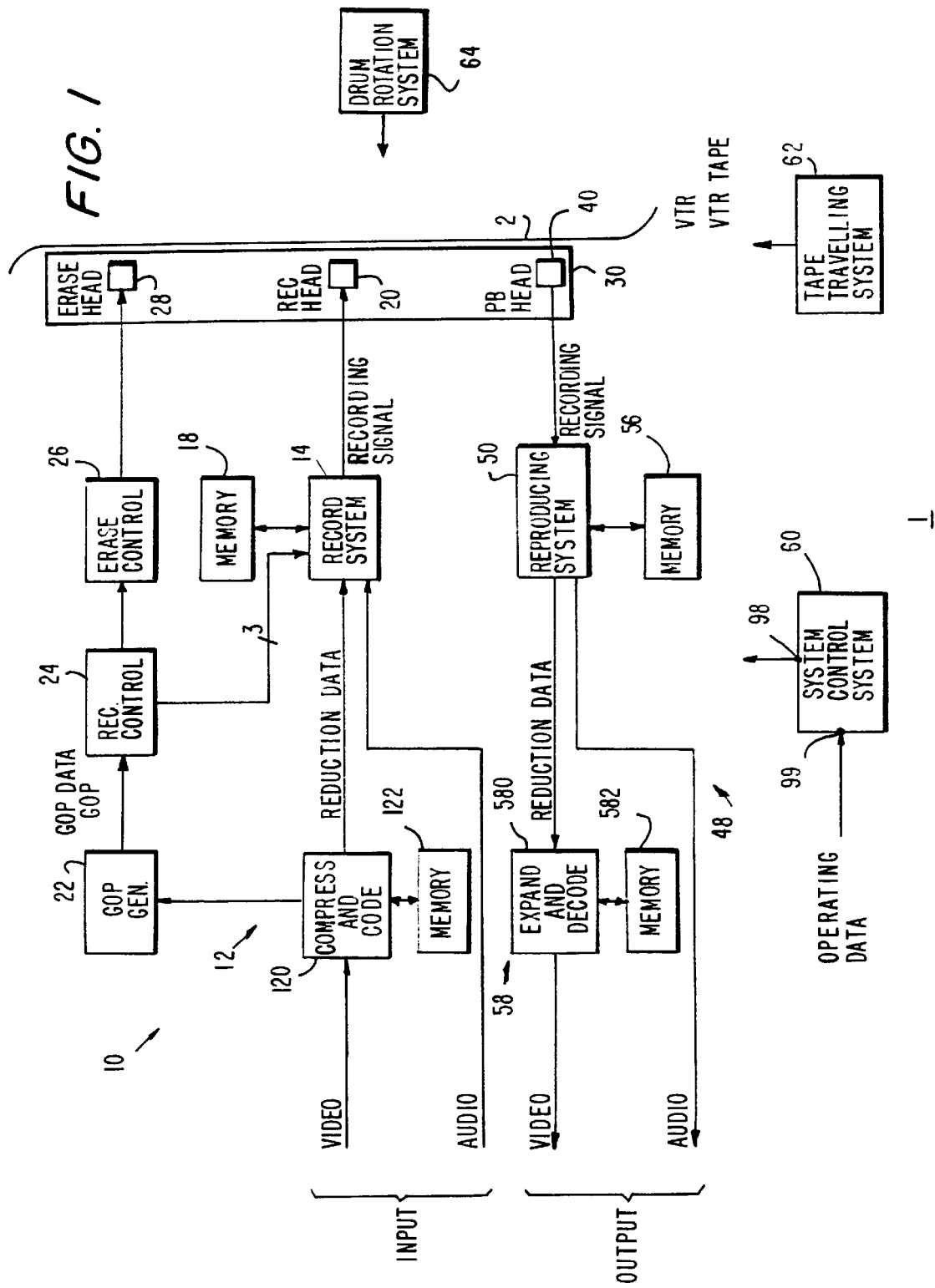
FIG. 1 is a diagram of a recording and reproducing apparatus according to a first embodiment of the present invention.

FIG. 1 illustrates a recording and reproducing apparatus 1 which is adapted to compress and/or code and/or process digital audio and video data supplied from an audio and video processing apparatus (such as an external editing apparatus or the like), record the compressed and/or coded and/or processed audio and video data onto helical tracks of a VTR tape 2 without tracing the helical tracks already existing on the VTR tape, reproduce the recorded audio and video data from the VTR tape by a so-called non-tracking method, expand and decode the reproduced data to restore the original audio and video data, and output the result. As shown in FIG. 1, such recording and reproducing apparatus 1 generally includes a drum 30, a system control circuit 60, a tape travelling system 62, a drum rotation system 64, a recording unit 10, and a reproducing unit 48. The recording unit 10 includes a compressing and coding unit 12 having a compressing and coding circuit 120 and a memory circuit 122, a recording system 14, a memory circuit 18, a recording head (REC HEAD) 20, a GOP data generating circuit 22, a recording control circuit 24, an erasing control circuit 26, and an erasing head (ERASE HEAD) 28. The reproducing unit 48 includes a playback head (PB HEAD) 40, a reproducing system 50, a memory circuit 56, and an expanding and decoding unit 58 having an expanding and decoding circuit 580 and a memory circuit 582.

The system control circuit 60 may receive input signals from operating switches (not shown) provided in the recording and reproducing apparatus 1 or from a terminal 99 or the like. In response to such input signals, the system control circuit is adapted to form control signals and to supply the same from an output terminal 98 to the appropriate one or ones of the elements in the recording and reproducing apparatus 1 so as to control the operation of such element(s). The tape travelling system 62 is adapted to control the travel or movement of the VTR tape 2. The drum rotation system 64 is adapted to control the rotation of the drum 30.

The recording unit 10 will now be further described hereinbelow.

The compressing and coding circuit 120 in the compressing and coding unit 12 receives non-compressed video data (VIDEO) from an external video processing apparatus (such as an editing apparatus, video tape recorder or the like). The compressing and coding circuit 120 compresses and codes the received video data by utilizing the memory circuit 122 according to a predetermined technique such as that of an MPEG (Moving Picture Expert Group) standard having units of a plurality of frames or GOPs (Group of Pictures). As a result, the compressing and coding circuit 120 generates compressed video data (REDUCTION DATA) and supplies the same to the recording system 14.

The GOP data generating circuit 22 receives an output from the compressing and coding circuit 120 and generates GOP data indicative of information about the boundary of the GOPs which are recorded based on the operational timing of the compressing and coding circuit. The generated GOP data is supplied from the GOP data generating circuit 120 to the recording control circuit 24.

The recording control circuit 24 receives the GOP data and, in accordance therewith, generates a control signal indicating recording ON/OFF (hereinafter, "the recording ON/OFF signal") and a signal indicating the starting point of the track for recording (hereinafter, "the track start signal"). Such generated signals may be utilized to control the operations of the recording system 14 and the erasing control circuit 26.

The erasing control circuit 26 generates an erasing signal and supplies the same to the erasing head 28 at a timing indicated by the recording ON/OFF signal received from the recording control circuit 24. As a result, audio and video data recorded on the VTR tape 2 at locations corresponding to the timing of such on/off signal may be erased.

Figure 2:
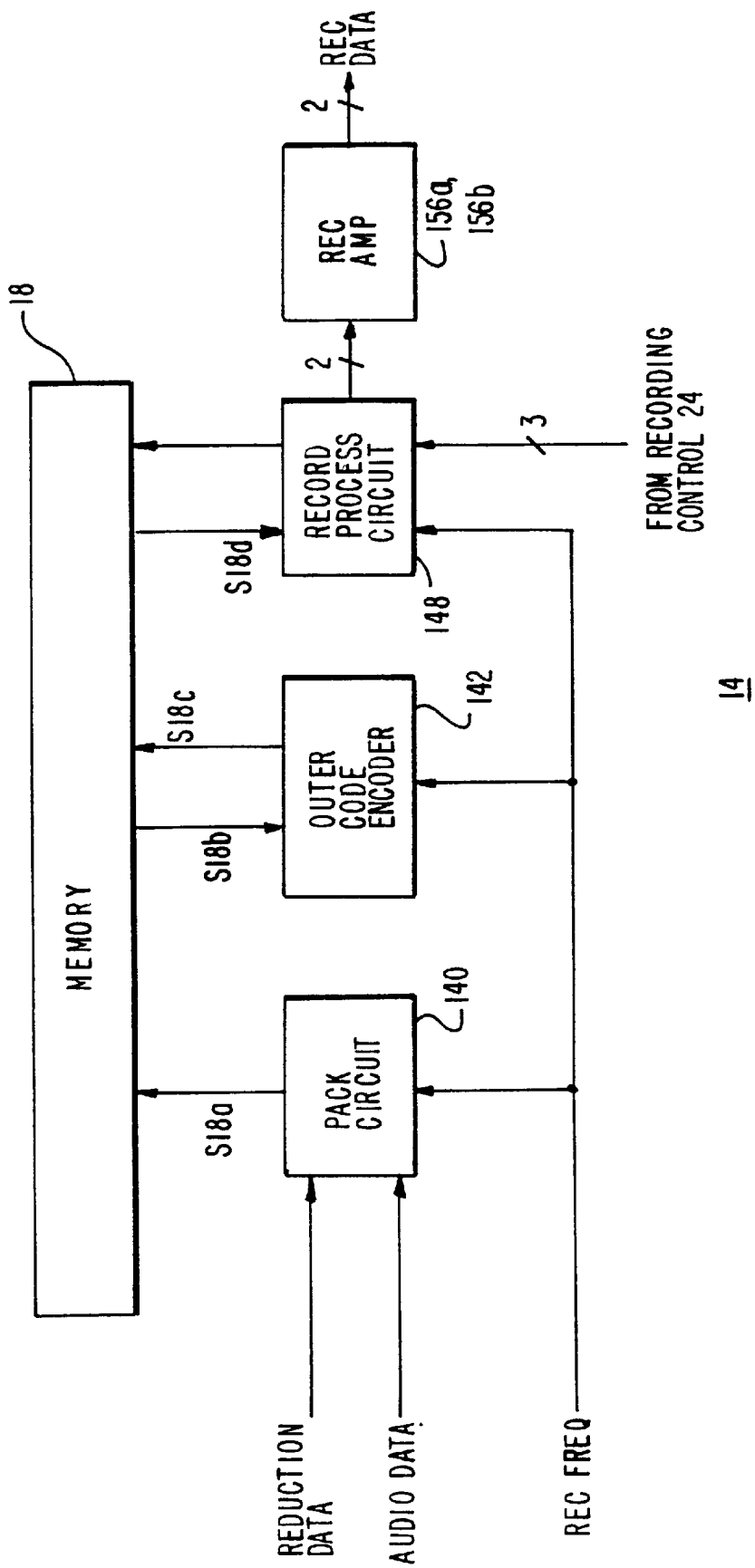
FIG. 2 is a diagram of a recording system of the apparatus of FIG. 1.

As illustrated in FIG. 2, the recording system 14 may include a pack circuit 140, an outer code encoder 142, a recording processing circuit 148, and recording amplifiers 156a and 156b. The pack circuit 140, the outer code encoder 142, and the recording processing circuit 148 operate in synchronization with a clock signal (REC Freq) of the recording signal applied to the helical tracks of the VTR tape 2 by way of the recording head 20.

The pack circuit 140 receives input audio data and the reduction data from the compressing and coding circuit 120 and supplies an output signal S18a to the memory circuit 18. More particularly, the pack circuit 140 may assemble the non-compressed audio data and the compressed video data into a predetermined recording format as, for example, shown in FIGS. 6(A) to 6(C) and store the same in the memory circuit 18.

Figure 6:
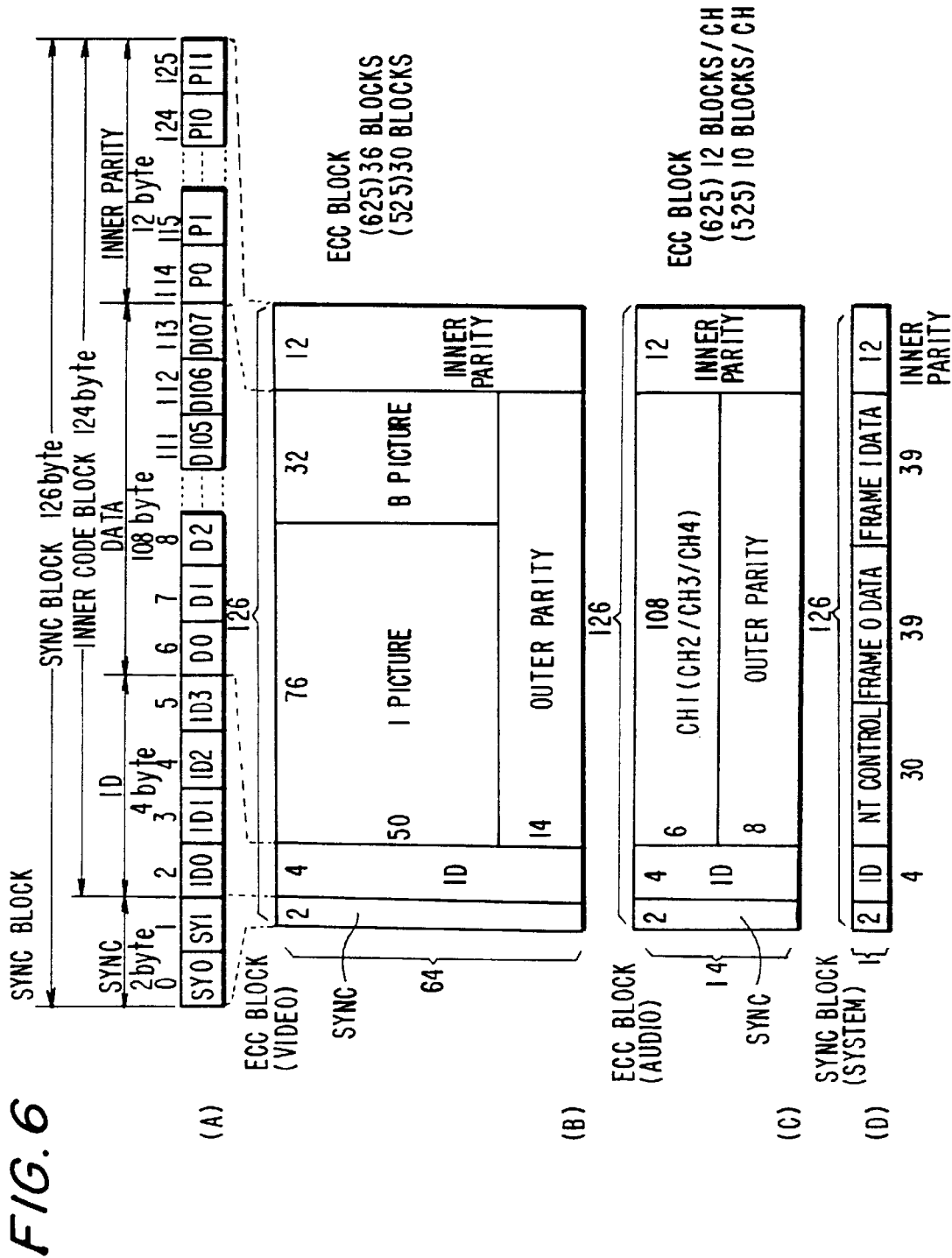
FIGS. 6 (A–D) are diagrams of recording formats of audio and video data.

The outer code encoder 142 may receive the assembled and stored audio and video data from the memory circuit 18 as an input signal S18b and may generate therefrom outer parity codes as, for example, shown in FIGS. 6(B) and (C) and may add such codes to the received audio and video data so as to form an output signal S18c which is supplied to the memory circuit 18.

The recording processing control circuit 148 may supply an output signal to the memory circuit 18 and may receive a signal S18d from the memory circuit 18 and an output signal(s) from the recording control circuit 24. The recording processing control circuit 148 may process the received signals so as to form record data signals which are supplied to the recording amplifiers 156a and 156b so as to be amplified, whereupon such amplified signals may be supplied to recording heads 20A and 20B (FIG. 3) so as to be recorded on the tape 2.

Figure 3:
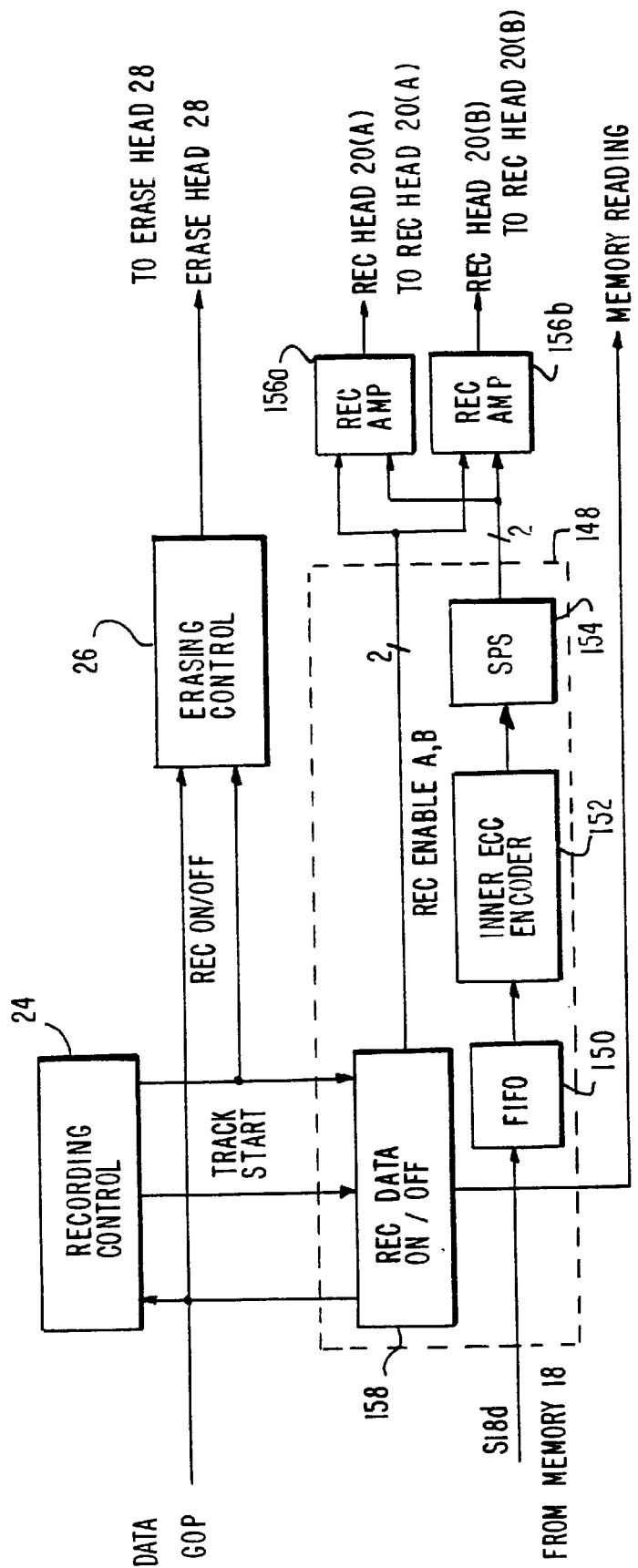
FIG. 3 is a diagram of a recording processing circuit of the recording system of FIG. 2.

As shown in FIG. 3, the recording processing circuit 148 may include a first in first out (FIFO) circuit 150, an inner code encoder circuit 152, a recording data on/off circuit 158, and a synchronization code adding and parallel/serial converting circuit (SPS circuit) 154. The track start signal and the recording ON/OFF signal from the recording control circuit 24 are supplied to the recording data on/off circuit 158, whereupon recording enable signals A and B are generated and respectively supplied to the recording amplifiers 156a and 156b so as to control the output of audio and video data from the recording amplifiers. The recording data on/off circuit 158 may also generate a memory reading signal based on the ON/OFF recording signal and supply the same to the memory circuit 18. In response to the memory reading signal, audio and video data from the memory circuit 18 may be supplied to the FIFO 150 as the signal S18d. The FIFO circuit 150 buffers the audio and video data received from the memory circuit 18 and outputs the same to the inner code encoder circuit 152. The inner code encoder circuit 152 generates an inner parity code as, for example, shown in FIGS. 6(B) and (C), from the audio and video data received from the FIFO circuit 150, adds the generated inner codes to the data, and outputs the resultant data to the SPS circuit 154. The SPS circuit 154 adds a synchronization code (such as shown in FIG. 6D) to the audio and video data having a parallel format received from the inner code encoder circuit 152, converts the same to audio and video data having a serial format, and outputs the resultant data to the recording amplifiers 156a and 156b. The recording amplifiers 156a and 156b respectively amplify the audio and video data received from the SPS circuit 154, generate the recording signals, and output the same to positive and negative azimuth heads of the recording heads 20.

The error correction codes generated by the outer code encoder 142 and the inner code encoder circuit 152 may be formed in accordance with a predetermined technique, such as a Reed-Solomon method, a Hamming method and so forth. Additionally, such generated error correction codes (which may be added to the audio and video data) may take the form of a product code (that is, inner code×outer code). Such code(s) may enable lost or non-recorded audio and video data to be recovered. As a result, even if one helical track or more of audio and video data is lost or not recorded for every GOP or predetermined group, such lost or not recorded data may be reproduced or recovered. In the present embodiment, the outer code encoder 142 and the inner code encoder circuit 152 add the product code (FIGS. 6B and 6C) to enable reproduction of all tracks even though two helical tracks of audio and video data may not be recorded for a GOP or predetermined group which is inserted onto the tape. By utilizing such approach, the present invention enables a relatively high quality reproduction of audio and video data.

The recording heads 20 may include positive azimuth heads A and negative azimuth heads B. The positive azimuth heads A and the negative azimuth heads B may be operated so as to alternately record the signals from the recording amplifiers 156a and 156b for every helical track. As a result, the azimuth angles associated with the recording signals of the helical tracks may be alternated or inverted for every helical track. The recording heads 20 may be further operated such that one GOP of audio and video data is contained in 12 helical tracks (for the 625/50 format) or in 10 helical tracks (in the 525/60 format) which is recorded on the VTR tape 2.

Figure 7:
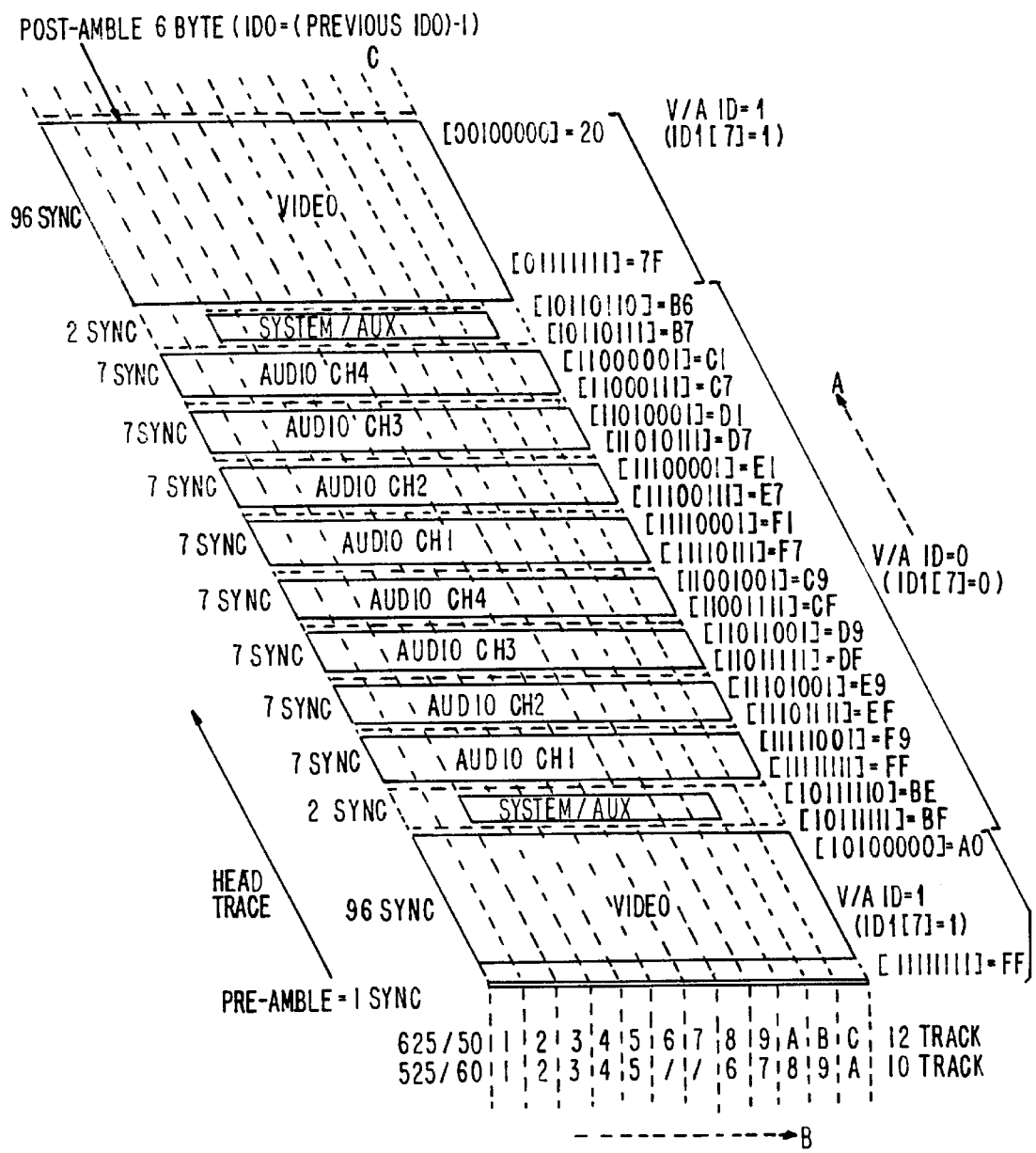
FIG. 7 is a diagram of audio and video data recorded on VTR tape.

FIG. 7 illustrates audio and video data recorded on the VTR tape 2.

The reproducing unit 48 will now be further described hereinbelow.

Figure 4:
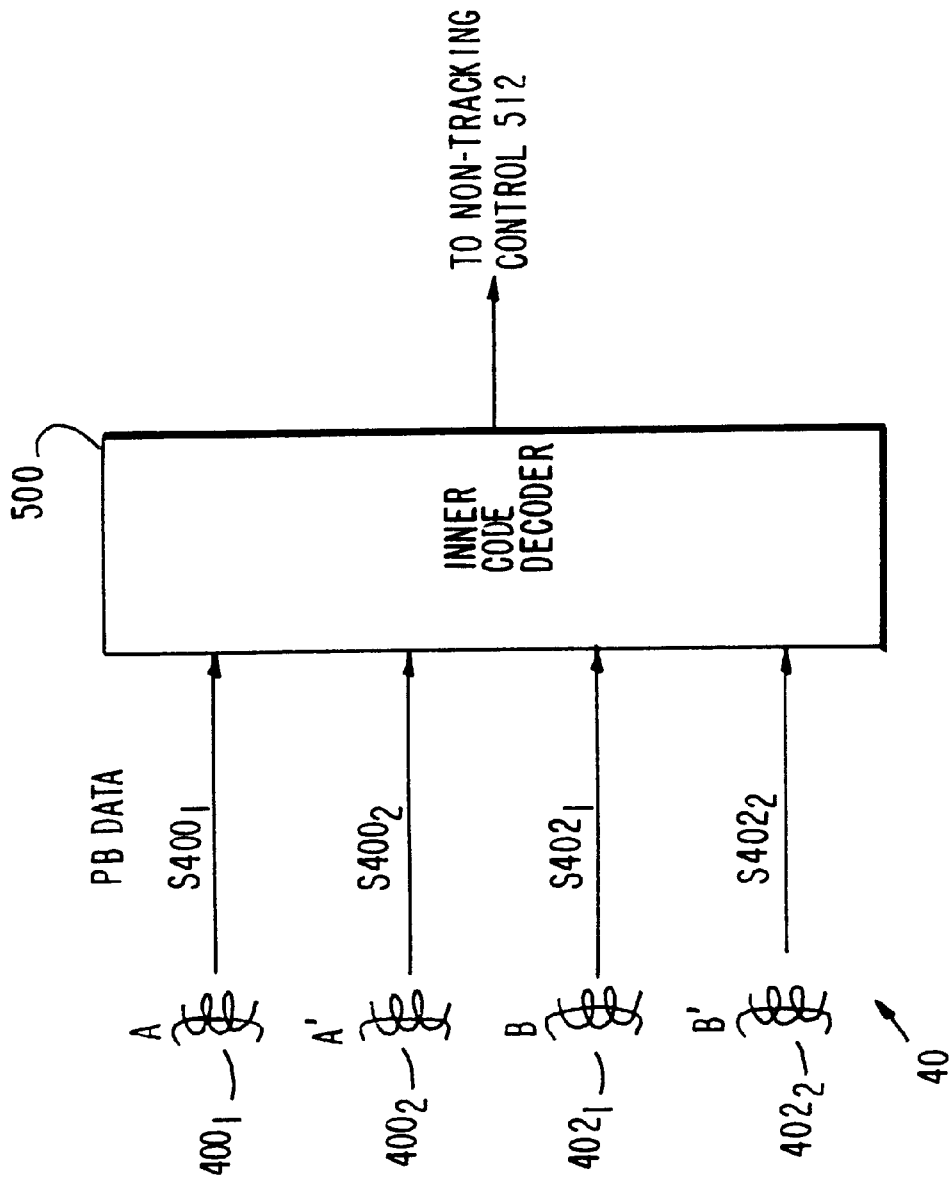
FIG. 4 is a diagram of playback heads of the apparatus of FIG. 1.

The playback head 40 is illustrated in FIG. 4. As shown therein, such playback head may include two positive azimuth playback heads (positive azimuth heads) $400_1$ and $400_2$ and two negative azimuth playback heads (negative azimuth heads) $402_1$ and $402_2$ which are coupled to an inner code decoder circuit 500 and arranged at the tape travelling surface of the drum 30 at intervals of one helical track width. Such positive and negative azimuth heads are adapted to reproduce data from the VTR tape 2 in a non-tracking manner and to supply the reproduced data to the inner code decoder 500 of the reproducing system 50.

Figure 5:
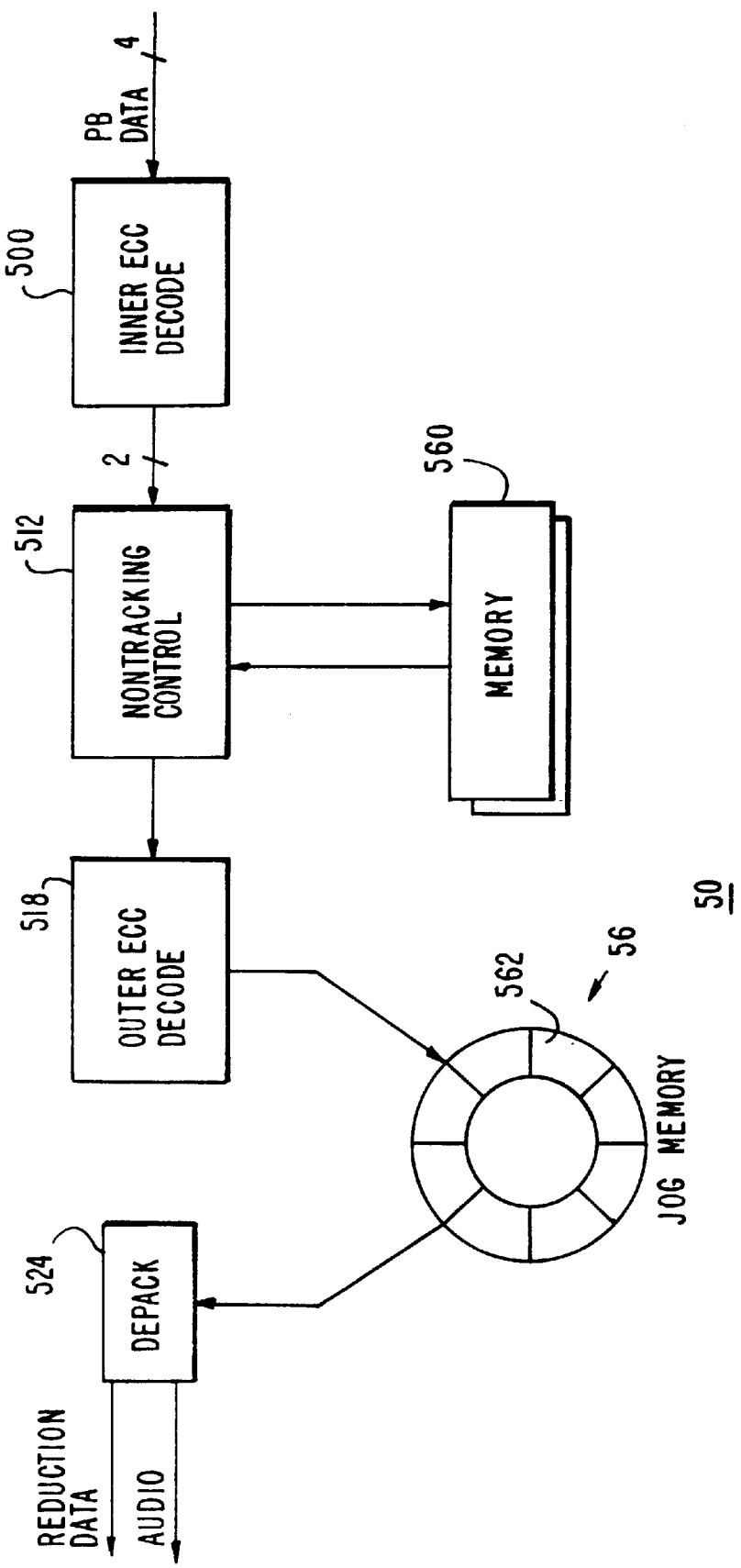
FIG. 5 is a diagram of a reproducing system of the apparatus of FIG. 1.

The reproducing system 50 is illustrated in FIG. 5. As shown therein, the reproducing system 50 may include the inner code decoder circuit 500, a non-tracking control circuit 512, and an outer code decoder circuit 518.

The inner code decoder circuit 500 converts the four recording signals $S400_1$, $S400_2$, $S402_1$, and $S402_2$ received from the positive azimuth heads $400_1$ and $400_2$ and negative azimuth heads $402_1$ and $402_2$ to four sets of audio and video data having a digital format. Further, the inner code decoder circuit 500 performs error detection and error correction of the audio and video data by using the inner code added to the four sets of audio and video data and outputs an error rate signal indicating the error rates of these sets of audio and video data to the non-tracking control circuit 512.

Figure 8A:
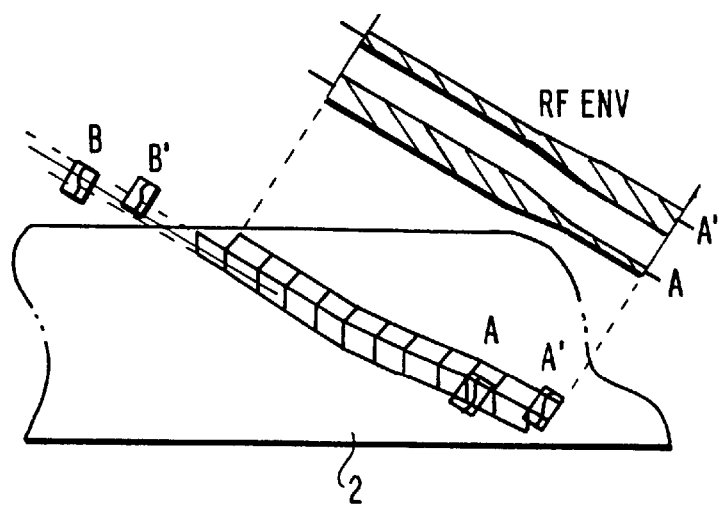
FIGS. 8(A) and (B) are diagrams to which reference will be made in explaining non-tracking control operations performed by a non-tracking control circuit of the reproducing system of FIG. 5.
Figure 8B:
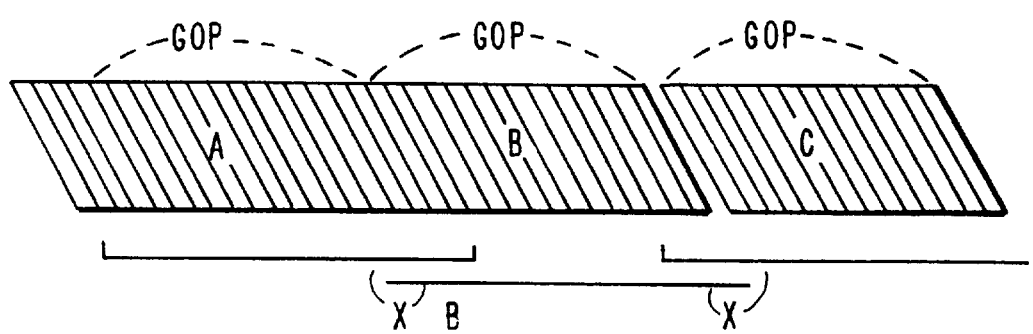

The non-tracking control circuit 512 is adapted to perform non-tracking control processing. That is, the non-tracking control circuit 512 may assign a priority to the sets of audio and video data based on the error rate signals received from the inner code decoder 500 and store the same in the memory circuit 560. For example, the non-tracking control circuit 512 may assign the highest priority to the set having the least error and may assign the lowest priority to the set having the most errors. As shown in FIG. 8(B), two helical tracks of audio and video data before and after each GOP may be stored in a memory circuit 560 so as to enable reproduction even during a helical reproduction phase (tracking) wherein a relatively large deviation occurs to a control track of the VTR tape 2 (a so-called X tone is deviated). In other words, the audio and video data of a first and last track may be stored in the memory circuit 560 in the event of a large X tone deviation.

The non-tracking control processing performed by the non-tracking control circuit 512 will now be further described with reference to FIG. 8A. As shown therein, when the positive azimuth heads $400_1$ and $400_2$ trace helical tracks having a positive azimuth angle associated therewith on the VTR tape 2 having a bend, the intensities of the audio and video data (recording signal) read by the positive azimuth heads $400_1$ and $400_2$ may vary as indicated by the widths of lines A and A'. In this situation, the negative azimuth heads $402_1$ and $402_2$ cannot properly read the audio and video data from the positive azimuth helical tracks. However, by tracing the VTR tape 2 by two heads which may have an interval of one helical track width, the audio and video data may be read even if each head does not precisely trace the helical track. Accordingly, such use of two or more heads enables audio and/or video data to be reproduced even if the tracks have a bend therein or are not properly aligned.

The outer code decoder circuit 518 may perform error correction on the four sets of audio and video data stored in the memory circuit 560 by using the outer code(s) contained in the audio and video data. The outer code decoder circuit 518 may output the set of audio and video data having the least error to a jog memory circuit 562. The jog memory circuit 562 may perform a so-called jog shuttle reproduction or outputting of the stored audio and video data to a depack circuit 524 in accordance with a control signal from the system control circuit 60 so as to enable a signal representing a picture or pictures to be transmitted at one of a number of speeds. The depack circuit 524 separates the audio data and video data from the received data and outputs the same. In particular, the depack circuit 524 supplies the obtained video data or REDUCTION DATA to the expanding and decoding circuit 580 (FIG. 1) and outputs the obtained audio data to an external apparatus.

The expanding and decoding circuit 580 is adapted to expand the compressed video data supplied from the record-ing system 50 in a manner substantially opposite to that performed by the compressing and coding circuit 120. The expanded and decoded video data may be supplied from the expanding and decoding circuit 580 to an external apparatus.

As hereinafter more fully described, the inner code decoder circuit 500 and the outer code decoder circuit 518 may reconstruct or restore data which was not recorded during the recording operation.

Figure 9:
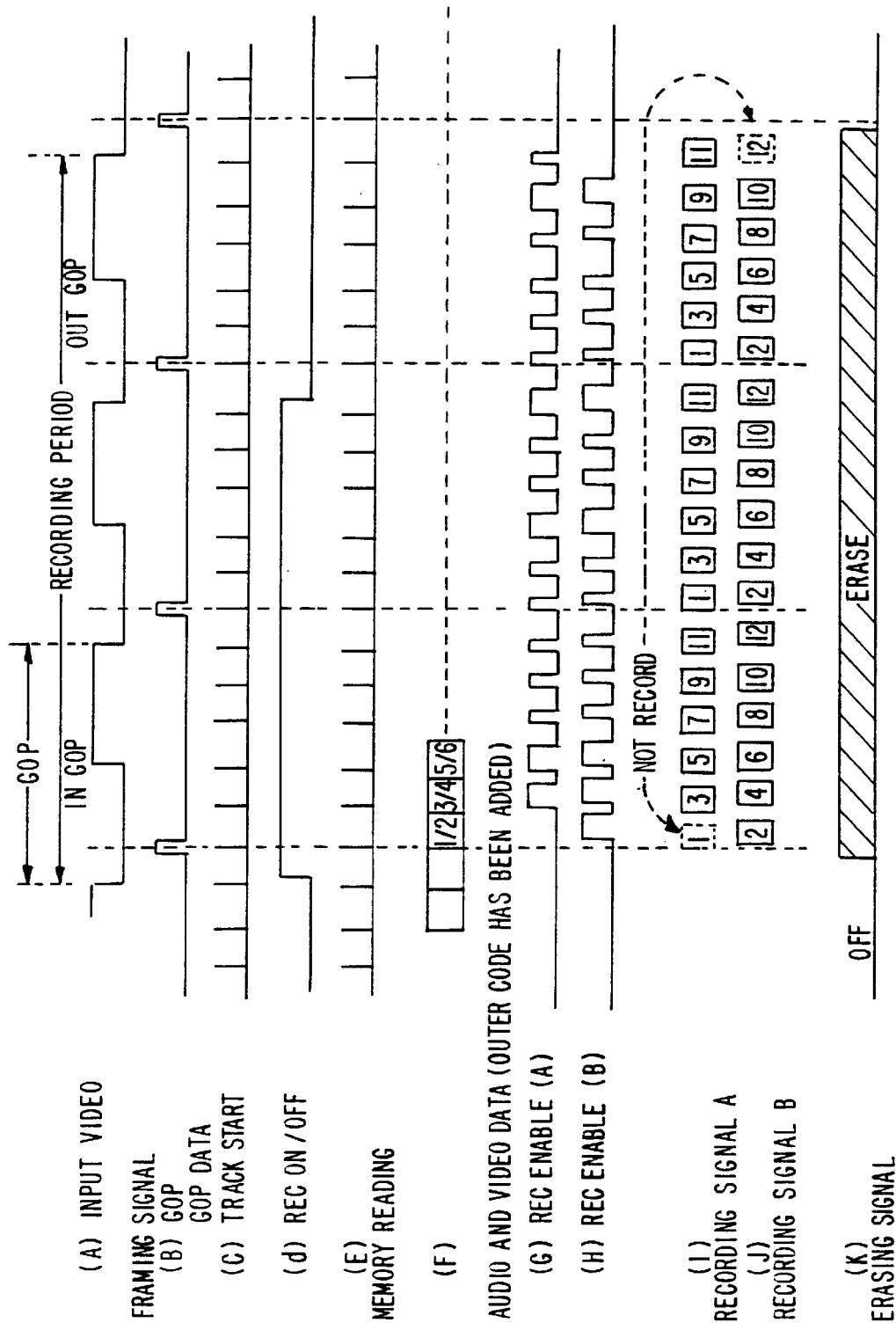
FIGS. 9(A–K) are timing charts to which reference will be made in explaining the operation of the recording and reproducing apparatus of FIG. 1.

The operation of the recording and reproducing apparatus 1 will now be described with reference to FIGS. 9 to 11. Such operation will be described for the situation in which audio and video data of the 625/50 format representing three GOPs is recorded on the VTR tape 2 on which audio and video data has already been recorded. A recording operation will be initially described, after which a reproducing operation will be described.

The compressing and coding unit 12 compresses and codes non-compressed video data (VIDEO) received from an external apparatus in GOP units at every cycle of a framing signal in which the falling point of the framing signal is a start point as shown in FIG. 9(A). The GOP data generating circuit 22 generates the GOP data which may indicate the start point of the audio and/or video data (REDUCTION DATA) compressed and coded by the compressing and coding unit 12 as shown in FIG. 9(B). The recording control circuit 24 may generate the track start signal (TRACK START) and the recording on/off signal (REC ON/OFF) as respectively shown in FIGS. 9(C) and 9(D) and may output one or both of such signals to the recording system 14 and the erasing control circuit 26.

The erasing control circuit 26 generates an erasing signal, such as that shown in FIG. 9(K), based on the GOP data (FIG. 9B) and the recording on/off signal (FIG. 9D) and outputs the same to the erasing head 28. In response to such erasing signal, the erasing head 28 may erase the audio and video data (the underlying data) which has already been recorded on the helical tracks of the VTR tape 2 during the term or time period corresponding to that indicated in FIG. 9(K).

In the recording system 14, the pack circuit 140 (FIG. 2) assembles the compressed video data and the non-compressed audio data into a recording format and stores the same in the memory circuit 18. Further, the outer code encoder 142 adds an outer code(s) to the audio and video data stored in the memory circuit 18. The recording processing circuit 148 generates the memory reading signal shown in FIG. 9(E) in accordance with the track start signal (FIG. 9C) and the recording on/off signal (FIG. 9D). As shown in FIG. 9(F), the recording processing circuit 148 reads the audio and video data recorded in the memory circuit 18 at a timing indicated by the memory reading signal, adds the inner code and synchronization code thereto, and outputs the resultant data to the recording amplifiers 156a and 156b. The recording data on/off circuit 158 (FIG. 3) of the recording processing circuit 148 generates recording enable signals A and B for enabling the recording of the data signals to the VTR tape 2 by the positive azimuth heads A and the negative azimuth heads B of the recording heads 20 as shown in FIGS. 9(G) and 9(H). A predetermined offset delay may be added to one of the recording enable signals, such as that for the negative azimuth heads. The positive azimuth heads A and negative azimuth heads B of the recording heads 20 respectively record the recording signals received from the recording amplifiers 156a and 156b to the VTR tape 2, as shown in FIGS. 9(I) and 9(J), only when the logical values of the recording enable signals A and B have a relatively high value (such as "1"). As indicated in FIGS. 9I and 9J, data is not be recorded in the first and last tracks of the group having three GOPs which is being inserted or recorded onto the tape 2 which already contains recorded data. In other words, the recording system 14 omits or does not record audio and video data on the first and last helical tracks of the group to be inserted onto the tape 2.

Figure 10A:
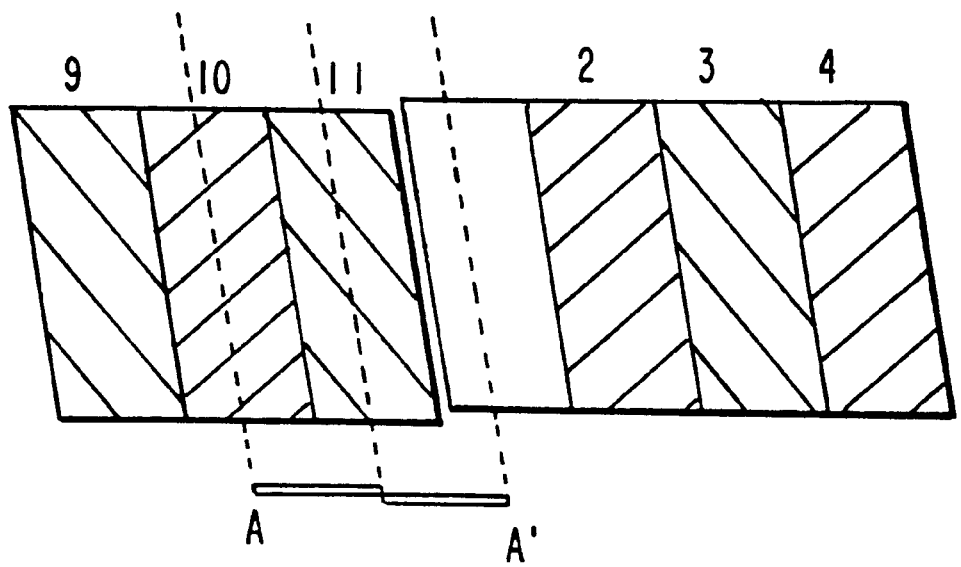
FIGS. 10(A) and (B) are diagrams of boundary portions of the audio and video data recorded on the VTR tape by the recording and reproducing apparatus of FIG. 1.
Figure 10B:
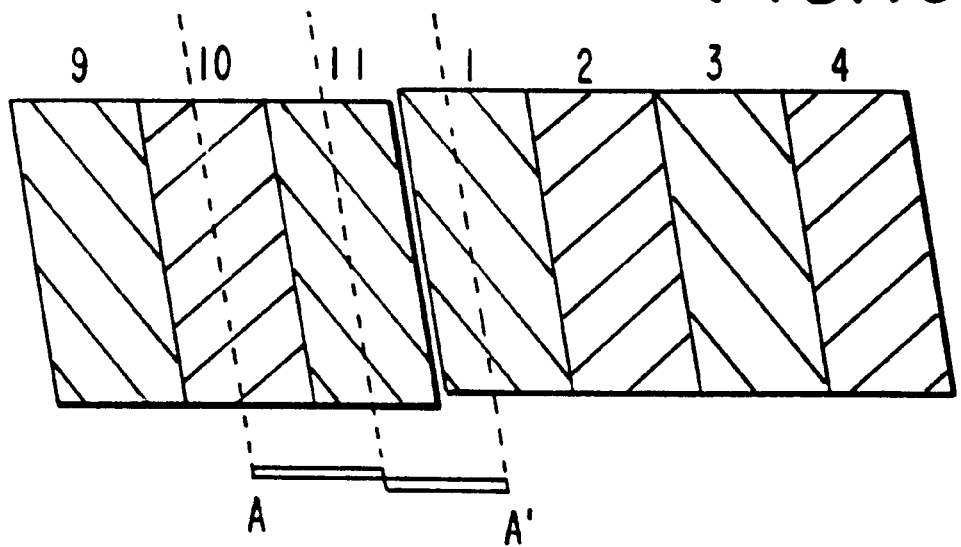
Figure 11:
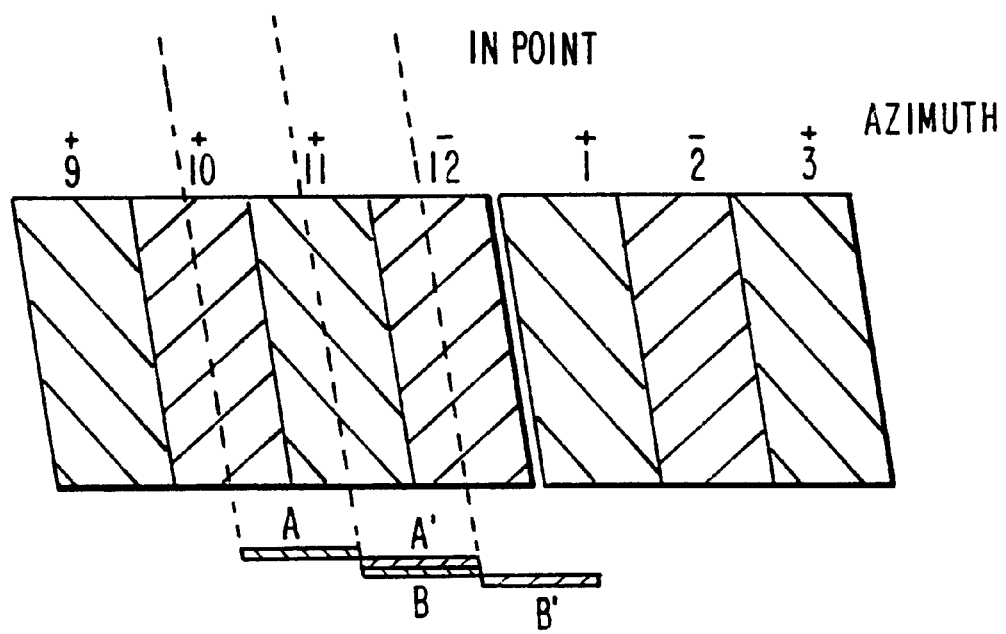
FIG. 11 is a diagram of a boundary part of audio and video data wherein the helical tracks are correctly traced during recording.

Therefore, in the above-described recording operation of the recording and reproducing apparatus 1, the first helical track and the last helical track of overlying audio and video data (recording signals) are not recorded on the VTR tape 2, and the underlying helical tracks corresponding to the overlying data are erased, as shown in FIGS. 10(A), 9(I), 9(J), and 9(K). (FIG. 10A illustrates a boundary portion of the audio and video data (recording signal) recorded on the VTR tape 2 by the recording and reproducing apparatus 1.) Such operation of the present recording and reproducing apparatus 1 may prevent errors during reproduction. As an example, consider the situation wherein the recording position is deviated by an amount of one track such that helical tracks having the same azimuth angle adjoin each other, as shown in FIG. 10(B). In this situation, during reproduction, the positive azimuth heads $400_1$ and $400_2$ or the negative azimuth heads $402_1$ and $402_2$ of the playback heads 40 may reproduce both the last helical track (helical track 11) of the underlying data and the first helical track (helical track 1) of the overlying data. As is to be appreciated, such reproduction produces errors. On the other hand, as shown in FIG. 10(A), if the present processing is performed, a situation during reproduction wherein the positive azimuth heads $400_1$ and $400_2$ or the negative azimuth heads $402_1$ and $402_2$ of the playback heads 40 reproduce both the last helical track of the underlying data and the first helical track of the overlying data may be prevented.

Further, error correction codes, such as a product code(s), may be provided to the audio and video data recorded on the VTR tape 2. By utilizing such product codes, the audio and video data may be reproduced even when one, two or more helical tracks of audio and video data are lost or not recorded per GOP or predetermined group. As a result, the recording and reproducing apparatus 1 may reproduce or restore the first and last helical track parts of the overlying data which were not recorded by utilizing the other audio and video data and the product code(s) contained in the same GOP or predetermined group. As such, the present recording and reproducing apparatus 1 may produce results similar to those obtained by correctly tracing the helical tracks on which the underlying data is recorded such that the boundary of the GOP of the overlying data is matched to the boundary of the GOP of the underlying data as shown in FIG. 11.

A reproducing operation of the recording and reproducing apparatus 1 will now be described.

The positive azimuth heads $400_1$ and $400_2$ and the negative azimuth heads $402_1$ and $402_2$ (FIG. 4) of the playback head 40 may read the signals recorded on the VTR tape 2 and supply the obtained four recording signals to the inner code decoder 500 of the recording system 50 (FIG. 5). The inner code decoder circuit 500 converts the received four recording signals to four sets of audio and video data having a digital format, performs error detection and error correction using the inner code(s), and generates the error rate signals. The non-tracking control circuit 512 may store the four sets of the audio and video data in the memory circuit 560 and may assign priorities thereto based on the error rate. The outer code decoder circuit 518 performs error correction on the audio and video data by using the outer code(s) and supplies the set of error corrected data having the smallest error rate to the depack circuit 524 by way of the jog memory 562. The depack circuit 524 separates the audio data and video data from the received data and supplies the video data to the expanding and decoding circuit 580 and supplies the audio data to an external apparatus. The expanding and decoding circuit 580 expands the compressed video data and outputs the same to an external apparatus.

As a result of the error correction performed a by the inner code decoder circuit 500 and the outer code decoder circuit 518, the audio and video data of the first and last helical tracks of overlying data which were not recorded during the recording operation (FIGS. 9I and 9J) may be restored and reproduced.

A further description of the error correction processing performed by the inner code decoder circuit 500 and the outer code decoder circuit 518 with regard to the restoration of omitted or non-recorded data will now be provided with reference to FIGS. 13A–13E.

Data and error correction codes may be arranged in block form as, for example, shown in FIG. 13A. As shown therein, a block 900 may include a data area 902, an outer parity code area 904, and an inner parity code area 906. The data area 902 may include data arranged in horizontal rows and vertical columns. Such arrangement of data may represent a predetermined arrangement of the data of a helical track or tracks. In other words, data to be recorded on the helical tracks of the tape may be arranged in a predetermined manner (which may not be a consecutive arrangement) in the data area(s) of a number of blocks. For example, data to be recorded on a first helical track of a group may be arranged at predetermined locations in the data areas of a plurality of blocks. The outer parity area 904 may include outer parity codes respectively obtained from the columns of data in the data area 902. For example, an outer parity code 909 may be obtained from a column 907 of data as shown in FIG. 13B. The inner parity code area 906 may include inner parity codes respectively obtained from the rows of data in the data area 902. For example, an inner parity code 915 may be obtained from a row 913 of data as shown in FIG. 13C.

A piece or pieces of data of a row or column in the data area 902 which were omitted or not recorded may be reconstructed by use of the other data within the respective row or column and the respective one of the inner parity code or outer parity code.

For example, assume that a piece of data or pixel 910 in a row 908 shown in FIG. 13D was omitted or not recorded. In this situation, the value of the pixel 910 may be obtained by using the other data pixels within the row 908 and an inner parity code 912 corresponding to the row 908. Such processing or decoding may be performed by the inner code decoder circuit 500.

As another example, assume that two pieces of data or pixels 910 and 914 in the row 908 shown in FIG. 13E were omitted or not recorded and that it is desired to obtain the value of the pixel 910. As shown in FIG. 13E, the pixel 910 is contained within the row 908 and a column 916. As such, in this situation, the value of the pixel 910 may be obtained by using the other data pixels within the column 916 and an outer parity code 918 corresponding to the column 916. Such processing or decoding may be performed by the outer code decoder circuit 518. As is to be appreciated, the value of the pixel 914 may be similarly obtained by using the other data within the respective column and the outer parity code corresponding thereto.

Thus, when recording overlying data which may overlap underlying data, the present recording and reproducing apparatus 1 erases the underlying data located in the area wherein the overlying data is to be recorded, adds an error correction code to the overlying data so as to enable reproduction of the two helical tracks of overlying data which are not to be recorded, and records the overlying data for the tracks other than the first and last tracks. Such arrangement may prevent erroneous reproduction results such as which may otherwise occur when audio and video data is reproduced by a non-tracking system wherein the azimuth angles of the helical tracks at the boundary of the overlying data and the underlying data coincide with each other. In such situation, the data in the boundary helical tracks having the same azimuth angles may be mixed during reproduction of the overlying and underlying data, thereby providing erroneous reproduced data.

Further, during reproduction, the recording and reproducing apparatus 1 restores the audio and video data which was not recorded on the first and last helical tracks of the overlying data. As a result, the present apparatus enables reproduced audio and video data to be obtained which is substantially the same as that which may be obtained by utilizing an apparatus wherein data is recorded by correctly tracing the helical tracks.

Although the present recording and reproducing apparatus was described as performing an editing function, the present apparatus is not so limited. For example, the present apparatus may also perform non-editing recording and reproduction operations, such as the recording and reproduction of only underlying data.

Further, the present apparatus may perform recording and reproduction of audio and video data having any predetermined format, such as the 525/60 format or the 625/50 format.

Furthermore, the functions and/or operations of the various elements of the present apparatus may be performed by the use of respective hardware devices or by software.

Since the above-described embodiment of the present recording and reproducing apparatus includes components used only for erasing audio and video data (such as the erasing head 28 and the erasing control circuit 26), such apparatus may have a relatively large size. As is to be appreciated, it may be desirable to provide the features of the present invention in an apparatus having a relatively small size. For example, it may be desirable to provide the present invention in a portable camcorder having a video camera and a VTR device or a simple recording and reproducing apparatus not aimed at performing an editing function or so forth. In such devices or apparatus, only a so-called full erase head for erasing all of a tape width may be provided and a so-called flying erase head for erasing the helical tracks one by one may not be provided. In a second embodiment of the present invention, a technique is provided which enables functions similar to those of the recording and reproducing apparatus 1 of the first embodiment to be provided in a simple recording and reproducing apparatus or the like.

The second embodiment of the present invention will now be described. As hereinafter more fully described, the apparatus of the second embodiment is similar to that of the first embodiment except that the erasing head 28 and the erasing control circuit 26 are omitted. Accordingly, the below description of the second embodiment will be presented with reference to the figures utilized in describing the apparatus of the first embodiment.

The compressing and coding unit 12 compresses and codes the non-compressed video data (VIDEO) supplied from an external apparatus. The GOP data generating circuit 22 generates the GOP data (FIG. 9B) which may provide an indication of the start point for the audio data and/or video data (REDUCTION DATA) compressed and coded by the compressing and coding unit 12. The recording control circuit 24 generates the helical track start signal (TRACK START) (FIG. 9C) and the recording on/off signal (REC ON/OFF) (FIG. 9D) in accordance with the GOP data. In the recording system 14, the pack circuit 140 (FIG. 2) assembles the compressed video data and the non-compressed audio data into the recording format and stores the same in the memory circuit 18; the outer code encoder 142 adds an outer code(s) to the audio and video data stored in the memory circuit 18; and the recording processing circuit 148 generates the memory reading signal (FIG. 9E) in accordance with signals from the recording control circuit 24, reads the audio and video data recorded in the memory circuit 18, and adds the inner code and the synchronization code thereto.

The above-mentioned components operate in a manner similar to or performs similar functions to that of the apparatus of the first embodiment. Accordingly, the previous description pertaining to such functions and/or operations may apply to the second embodiment and, as such, a further description thereof is omitted herein.

Figure 12:
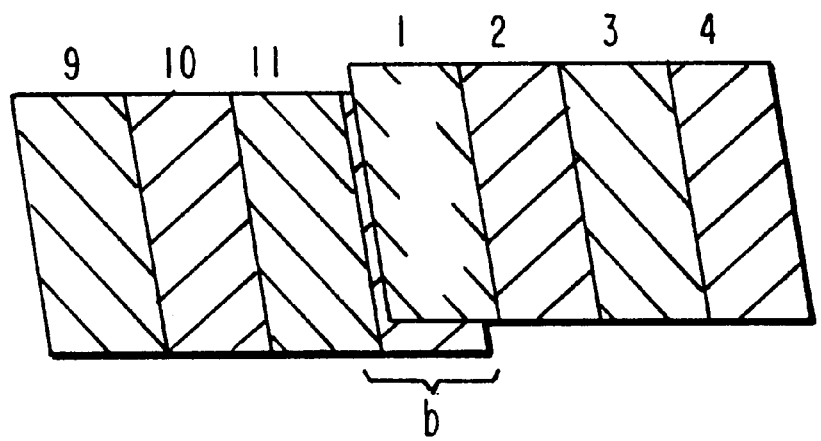
FIG. 12 is a diagram of audio and video data recorded on a VTR tape to which reference will be made in explaining a recording and reproducing apparatus according to a second embodiment of the present invention.

The SPS circuit 154 (FIG. 3) may apply a signal having a predetermined frequency to the first and last helical tracks (overlying tracks) by way of the recording heads 20 as shown in FIG. 12. Such predetermined frequency be a relatively high frequency, such as a frequency of ½ of the clock signal (REC freq.) of the recording signal. The recording data on/off circuit 158 generates recording enable signals (REC ENABLE A, B) so as to enable the high frequency signals to be recorded on the first and last overlying helical tracks of the VTR tape 2 by the positive azimuth heads A and negative azimuth heads B of the recording heads 20. Additionally, the recording heads 20 may record the audio and video data (recording signal) supplied from the SPS circuit 154 onto the VTR tape 2.

The audio and video data (recording signal) recorded on the VTR tape 2 as described above may be reproduced by the reproduction operation of the recording and reproducing apparatus 1 in a manner similar to that in the first embodiment.

By recording a high frequency signal on the first and last helical tracks of the overlying data, effects or influence from the underlying data which was previously recorded may be almost completely eliminated. As such, results or an effect substantially equivalent to the above-described situation wherein the underlying data of these helical tracks are erased may be obtained. Further, the second embodiment enables such advantageous results to be obtained without the erasing head 28 and the erasing control circuit 26. As is to be appreciated, the arrangement of the second embodiment enables an apparatus embodying the same to be provided in a relatively small size and at a relatively low cost. Accordingly, such apparatus of the second embodiment may be well suited for use in a simple recording and reproducing apparatus or the like.

Further, the frequency of ½ the clock signal (REC Freq.) of the recording signal may not be utilized for reproduction equalization processing during reproduction. Accordingly, the use thereof as previously described will not adversely effect the reproduction of the audio and video data.

Therefore, as described above, the present recording and reproducing apparatus may avoid data errors which may otherwise occur upon the reproduction of audio and video data wherein such data was inserted over previously recorded data (over-written) by using a non-tracking technique in which the existing tracks are not traced. Additionally, by applying a high frequency signal (such as that having a frequency of ½ the clock signal of the recording signal) instead of erasing the underlying data as previously described, the present apparatus may be applied to an inexpensive recording and reproducing apparatus not having an erasing head and an erasing control circuit.

U.S. Pat. No. 5,231,543 (assigned to Sony Corporation) which describes recording and reproducing without tracking control is hereby incorporated by reference.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. An apparatus for recording video data onto a recording medium and for reproducing the recorded data therefrom, said apparatus comprising:

control means for generating an insertion control signal which indicates at least one of a starting point and an ending point of data to be inserted on said recording medium;

error correction code adding means for adding an error correction code to audio and video data representing a group which is to be recorded in helical tracks of said recording medium;

recording means, responsive to said insertion control signal, for omitting the audio and video data of a first helical track and a last helical track and for azimuth recording the audio and video data of the other helical tracks of said group which include the error correction codes;

reproducing means for reproducing the audio and video data recorded on the helical tracks of said recording medium; and means for producing the audio and video data for the first helical track and the last helical track which were not recorded on said recording medium by using the audio and video data of the other helical tracks of said group and the error correction codes.

2. An apparatus according to claim 1, wherein said control means further generates an erasing control signal and further comprising erasing means for erasing a portion of previously recorded data in response to said erasing control signal.

3. An apparatus according to claim 1, wherein the recording means includes means for recording a signal having a predetermined frequency on the first helical track and last helical track.

4. An apparatus according to claim 3, wherein said predetermined frequency has a value of one-half of a clock signal of a recording signal.

5. A method for recording video data onto a recording medium and for reproducing the recorded data therefrom, said method comprising the steps of:

generating an insertion control signal which indicates at least one of a starting point and an ending point of data to be inserted on said recording medium;

adding an error correction code to audio and video data representing a group which is to be recorded in helical tracks of said recording medium;

omitting the audio and video data of a first helical track and a last helical track and azimuth recording the audio and video data of the other helical tracks of said group which include the error correction codes in response to said insertion control signal;

reproducing the audio and video data recorded on the helical tracks of said recording medium; and producing the audio and video data for the first helical track and the last helical track which were not recorded on said recording medium by using the audio and video data of the other helical tracks of said group and the error correction codes.

6. A method according to claim 5, further comprising the steps of generating an erasing control signal and erasing a portion of previously recorded data in response to said erasing control signal.

7. A method according to claim 5, further comprising the step of recording a signal having a predetermined frequency on the first helical track and last helical track.

8. A method according to claim 7, wherein said predetermined frequency has a value of one-half of a clock signal of a recording signal.

9. An apparatus for recording video data onto a recording medium on which data has already been recorded and for reproducing the recorded data therefrom, said apparatus comprising:

data recording means for recording the video data onto helical tracks of said recording medium such that the video data of a first helical track and a last helical track within a predetermined group of helical tracks is omitted and the video data of the other helical tracks within the predetermined group are azimuth recorded;

error correction code generating means for producing error correction codes for combination with the video data to be recorded on said recording medium;

reproducing means for reproducing the video data recorded on said recording medium; and means for producing the video data for the first helical track and the last helical track by using the other video data of the predetermined group and the error correction codes.

10. An apparatus according to claim 9, wherein said reproducing means includes at least two playback heads for scanning the helical tracks of said recording medium so as to obtain a plurality of sets of read video data therefrom and means for detecting errors in each set of the read video data and for selecting the set having the least detected errors.

11. An apparatus according to claim 10, wherein the data recording means includes means for erasing selective portions of previously recorded data from said recording medium.

12. An apparatus according to claim 11, wherein the erasing means erases the previously recorded data corresponding to that between the first and last helical tracks.

13. An apparatus according to claim 10, wherein the error correction codes produced by the error correction code generating means include inner and outer error correction codes.

14. An apparatus according to claim 10, wherein the error correction codes produced by the error correction code generating means include product error correction codes.

15. An apparatus according to claim 10, further comprising means for recording a signal having a first predetermined frequency onto the first and last helical tracks.

16. An apparatus according to claim 15, wherein said data recording means is operative in accordance with a clock signal having a second predetermined frequency and wherein said first predetermined frequency is approximately equivalent to one-half said second predetermined frequency.

17. A method for recording video data onto a recording medium on which data has already been recorded and for reproducing the recorded data therefrom, said method comprising the steps of:

recording the video data onto helical tracks of said recording medium such that the audio and video data of a first helical track and a last helical track within a predetermined group of helical tracks is omitted and the video data of the other helical tracks within the predetermined group are azimuth recorded;

producing error correction codes for combination with the video data to be recorded on said recording medium;

reproducing the video data recorded on said recording medium; and producing the video data for the first helical track and the last helical track by using the other video data of the predetermined group and the error correction codes.

18. A method according to claim 17, wherein the reproducing step includes scanning the helical tracks of said recording medium with at least two playback heads so as to obtain a plurality of sets of read video data therefrom, and detecting errors in each set of the read video data and selecting the set having the least detected errors.

19. A method according to claim 18, wherein the recording step includes erasing selective portions of previously recorded data from said recording medium.

20. A method according to claim 19, wherein the erasing step erases the previously recorded data corresponding to that between the first and last helical tracks.

21. A method according to claim 18, wherein the error correction codes include inner and outer error correction codes.

22. A method according to claim 18, wherein the error correction codes include product error correction codes.

23. A method according to claim 18, further comprising the step of recording a signal having a first predetermined frequency onto the first and last helical tracks.

24. A method according to claim 23, wherein the recording of the video data is performed in accordance with a clock signal having a second predetermined frequency and wherein said first predetermined frequency is approximately equivalent to one-half said second predetermined frequency.

25. A non-tracking apparatus for recording video data onto a number of tracks of a recording medium over previously recorded data in existing tracks and/or for reproducing the recorded data therefrom, said apparatus comprising:

means for receiving the video data pertaining to a predetermined group corresponding to a number of tracks and for recording at least a portion of the received video data onto said recording medium such that the video data of a first track and a last track is omitted and the video data of the other tracks within the predetermined group are azimuth recorded without tracing the existing tracks of said recording medium;

error correction code generating means for producing error correction codes for combination with the video data to be recorded on said recording medium;

reproducing means for reproducing the video data recorded on said recording medium; and means for producing the video data for the first helical track and the last helical track by using the other video data of the predetermined group and the error correction codes.

26. A non-tracking apparatus according to claim 25, wherein said reproducing means includes data reading means having four playback heads in which two of said playback heads have a first azimuth angle and the other two of said playback heads have a second azimuth angle for scanning the tracks of said recording medium so as to obtain four sets of read video data therefrom, and means for detecting errors in each set of the read video data and for selecting the set having the least detected errors.

27. An apparatus according to claim 26, wherein the error correction codes produced by the error correction code generating means include product error correction codes.

28. An apparatus according to claim 26, wherein the recording means includes means for erasing selective portions of the previously recorded data from said recording medium.

29. An apparatus according to claim 28, wherein the erasing means erases the previously recorded data corresponding to that between the first and last helical tracks.

30. An apparatus according to claim 26, further comprising means for recording a signal having a first predetermined frequency onto the first and last helical tracks.

31. An apparatus according to claim 30, wherein the recording means is operative in accordance with a clock signal having a second predetermined frequency and wherein said first predetermined frequency is approximately equivalent to one-half said second predetermined frequency.

32. A non-tracking method for recording video data onto a number of tracks of a recording medium over previously recorded data in existing tracks and/or for reproducing the recorded data therefrom, said method comprising the steps of:

receiving the video data pertaining to a predetermined group corresponding to a number of tracks and recording at least a portion of the received video data onto said recording medium such that the video data of a first track and a last track is omitted and the video data of the other tracks within the predetermined group are azimuth recorded without tracing the existing tracks of said recording medium;

producing error correction codes for combination with the video data to be recorded on said recording medium;

reproducing the video data recorded on said recording medium; and producing the video data for the first helical track and the last helical track by using the other video data of the predetermined group and the error correction codes.

33. A non-tracking method according to claim 32, wherein the reproducing step includes scanning the tracks of said recording medium by using four playback heads in which two of said playback heads have a first azimuth angle and the other two of said playback heads have a second azimuth angle so as to obtain four sets of read video data therefrom, and detecting errors in each set of the read video data and selecting the set having the least detected errors.

34. A method according to claim 33, wherein the error correction codes include product error correction codes.

35. A method according to claim 33, wherein the recording step includes erasing selective portions of the previously recorded data from said recording medium.

36. A method according to claim 35, wherein the erasing step erases the previously recorded data corresponding to that between the first and last helical tracks.

37. A method according to claim 33, further comprising the step of recording a signal having a first predetermined frequency onto the first and last helical tracks.

38. A method according to claim 37, wherein the recording of the video data is performed in accordance with a clock signal having a second predetermined frequency and wherein said first predetermined frequency is approximately equivalent to one-half said second predetermined frequency.

* * * * *